(12) United States Patent
Long et al.

(10) Patent No.: US 10,028,517 B2
(45) Date of Patent: Jul. 24, 2018

(54) DEVICES AND METHODS FOR HEATING FOOD USING HIGH FREQUENCY ENERGY

(71) Applicant: GLL, LLC, Cincinnati, OH (US)

(72) Inventors: Gary Lee Long, Cincinnati, OH (US); Gregory J. Bakos, Mason, OH (US)

(73) Assignee: GLL, LLC, Cincinnati, OH (US)

( * ) Notice: Subject to any disclaimer, the term of this patent is extended or adjusted under 35 U.S.C. 154(b) by 667 days.

(21) Appl. No.: 14/574,621

(22) Filed: Dec. 18, 2014

(65) Prior Publication Data

US 2015/0164127 A1 Jun. 18, 2015

Related U.S. Application Data

(60) Provisional application No. 61/917,484, filed on Dec. 18, 2013.

(51) Int. Cl.
*H05B 3/00* (2006.01)
*A47J 36/24* (2006.01)
*A23L 3/005* (2006.01)

(52) U.S. Cl.
CPC ........... *A23L 3/005* (2013.01); *A47J 36/2483* (2013.01); *H05B 3/0004* (2013.01); *Y02P 60/85* (2015.11)

(58) Field of Classification Search
CPC .......................... H05B 3/0004; A47J 36/2483
USPC ........... 99/358; 219/386, 771, 780; 426/107, 426/234, 244
See application file for complete search history.

(56) References Cited

U.S. PATENT DOCUMENTS

| | | | |
|---|---|---|---|
| 3,873,742 A * | 3/1975 | Miyahara | A23L 3/005 426/234 |
| 3,886,290 A | 5/1975 | Theimer et al. | |
| 3,966,972 A | 6/1976 | Theimer et al. | |
| 4,099,454 A * | 7/1978 | Theimer | H05B 3/0004 219/383 |
| 4,303,820 A * | 12/1981 | Stottmann | H05B 6/48 219/771 |
| 4,522,834 A | 6/1985 | Miyahara | |
| 4,554,440 A | 11/1985 | Lee, Jr. | |
| 4,812,609 A * | 3/1989 | Butot | H05B 6/54 219/771 |
| 4,822,982 A | 4/1989 | Lee, Jr. | |
| 4,971,819 A * | 11/1990 | Miyahara | F24C 7/008 219/771 |
| 5,055,312 A | 10/1991 | Hildebrand | |
| 5,069,920 A | 12/1991 | Hildebrand | |
| 6,034,359 A * | 3/2000 | Busch | A47J 27/004 219/497 |
| 6,303,166 B1 * | 10/2001 | Kolbe | A23B 4/01 219/771 |

(Continued)

*Primary Examiner* — Reginald L Alexander
(74) *Attorney, Agent, or Firm* — Dinsmore & Shohl LLP

(57) ABSTRACT

Cooking devices are disclosed that can cook food in a convenient, fast and energy-efficient manner with electromagnetic energy. In one embodiment, the device can comprise a food container wherein the container includes a first electrode, a second electrode, and an insulating exterior, a power source for RF electromagnetic energy, and a controller. In another embodiment, a cooking device in the form of a pouch containing food can directly preheat or cook food in the pouch. A variety of electrode embodiments and cooking devices including those with multiple compartments is disclosed.

14 Claims, 14 Drawing Sheets

(56) References Cited

U.S. PATENT DOCUMENTS

2014/0287112 A1\* 9/2014 Hukelmann ............ A23L 3/005
426/244

\* cited by examiner

DEVICES AND METHODS FOR HEATING FOOD USING HIGH FREQUENCY ENERGY

CROSS-REFERENCE TO RELATED APPLICATIONS

This application claims the benefit of priority to U.S. Provisional Application No. 61/917,484, filed Dec. 18, 2013, the details of which are incorporated herein by reference in their entirety.

FIELD

The present specification is directed to methods and devices that cook food with a high frequency power source, and includes features that can control cooking to a predictable temperature based on the desired taste and degree of doneness, can allow remote cooking wherein the power source is separated from the food, and can permit specialized packaging that provides a cooking environment and traps fluids.

BACKGROUND

Convenient food preparation is an important consideration in the modern era with a substantial fraction of the population engaged in diverse busy activities and time often being of the essence. The ability to cook food remotely from a power source can save energy, add convenience, and make cleaning easier. For example, being able to directly cook food from a frozen state to a well-cooked or done state can be a major convenience. Likewise, packaging food in a way that allows easy and direct movement from freezer to fridge to cooking appliance can be a significant advantage when time considerations are paramount, and preparing food at a predictable temperature is convenient and beneficial from both taste and health standpoints.

Cooking methods are known using electricity and include descriptions of packaging methods for heating food (such as disclosed in U.S. Pat. Nos. 5,069,920, 5,055,312, 4,971,819, 4,099,454, 3,966,972 and 3,886,290), control of heating output to arrive at a desired degree of doneness (such as disclosed in U.S. Pat. Nos. 6,034,359, 4,822,982 and 4,554,440), and large scale food sterilization (as disclosed in U.S. Pat. Nos. 4,522,834 and 4,496,594). Methods for heating a single packaged food item electrically in a package with a disposable lid have been described in U.S. Pat. Nos. 5,055,312 and 5,069,920. A circuit that measures RMS current to determine the degree of doneness was discussed in detail in U.S. Pat. No.4,554,440. A control circuit that stops current flow and pneumatically retracts electrodes was disclosed in U.S. Pat. No. 6,034,359.

SUMMARY

While the general area of controlled cooking with electricity is known, as the above examples indicate, there is room for substantial improvement. In particular, the ability to use electrodes with potentially alternating or programmable polarity has not been exploited hitherto Likewise, there is a need for methods, algorithms and timer circuits that stop cooking at a point determined and calibrated by meat type; such food-dependent automated cooking can offer considerable conveniences in food preparation. Similarly, there is much potential utility for a novel type of food container capable of cooking food by electrical means that can directly be connected to a power source. Indeed, the methods and devices disclosed here can permit the cooking of food even inside a refrigerator, or a means of grilling food on a surface that is not hot. In some embodiments, food can be cooked directly by connection to a remote power source and the extent of cooking controlled by monitoring impedance. All these elements can result in substantial improvements in the art and enjoyment of cooking and are more fully disclosed in the following.

The present specification generally relates to devices and methods that can cook food with a high frequency electromagnetic power source, and includes features that can control cooking at a predictable temperature based on a desired taste and degree of doneness, can allow remote cooking whereby the power source is separated from the food, and provide specialized packaging that provides a cooking environment and can trap fluid.

The methods and devices may directly applying high frequency electromagnetic energy (in the approximate range of 1 kHz to 1 MHz) to cook food at a distance away from a power source. The methods and devices can also provide a means for conveniently cooking meat in a cooking compartment that allows drainage and storage of juices, and that can be washed and sanitized in a common dishwasher. The methods and devices can also include food packaging devices with incorporated cooking elements that can be connected to a remote power source to heat food, including heating frozen food to a cooked state. Furthermore, methods and devices to monitor the doneness of the food while it is cooked with hot plates are also described, as further elaborated below.

In one embodiment, the present disclosure provides a method of applying high frequency energy to food (meat) with direct contact electrodes to elevate its temperature through resistive heating to cook it prior to eating, along with a device to preserve and cook food comprising a fluid-tight container, a first conductive electrode on a first inner surface of container, a second conductive electrode on a second inner surface of container, and conductive connectors that extend from each conductive electrode to an exterior surface. In one configuration, the a system is provided to remotely cook food comprising a power source, a conductive pair of electrodes, an insulated package, and food in direct contact with the electrodes. In one embodiment, a device is provided to preserve food by cooking, comprising a pouch, two electrodes inside the pouch in direct contact with the food, and connectors on the outside of the pouch to connect to high frequency power source. The methods disclosed herein can also allow for the seemingly counter-intuitive cooking of food inside a refrigerator, or for the grilling of food on a surface that is not hot.

The methods can also provide for a monitored, automated cooking system for a home that includes a power source in a central location, multiple conductive electrical pathways connected to power source, conductive pathway connectors that interface with a connector on a specialized package containing food, and a control unit to monitor impedance and stop energy flow at a predetermined impedance level that could depend on the type of food being cooked. In one embodiment, the disclosure includes a method of preheating frozen food to a temperature of about −1° C. and then cooking through resistive heating. In another embodiment, the methods can include the application of low amplitude, high frequency electromagnetic energy to monitor the level of doneness (rare, medium and well) of food while it is cooked with hot plates.

In another embodiment, a cooking device includes a food container wherein the container includes a first electrode, a second electrode, and an insulating exterior. A power source for RF electromagnetic energy and a controller are provided.

In another embodiment, a device for packaging food includes an insulating outer covering, a first conductive electrode, a second conductive electrode, and a portion of food that has a predetermined impedance.

In another embodiment, a device for cooking food includes an energy source, first and second electrodes for delivering electromagnetic energy, a controller, a first cooking chamber, a second cooking chamber, and a connection between the first and second chambers.

DETAILED DESCRIPTION

The cooking device of the present specification applies high frequency biphasic waves to food. In one embodiment, the cooking device comprises three components: a food compartment, a power source, and a controller. Food is brought in contact with at least two electrodes. The electrodes are connected to a power source capable of producing tens to hundreds of Watts of power into a low impedance load. The controller governs the power source output. In some embodiments, the controller also monitor properties of the food and uses those measured properties to increase, decrease, or otherwise change the output from the power source to achieve a desired state of cooking.

The food compartment contains electrodes to be placed in contact with food that is to be cooked. The electrodes are connected to the power source, which allows electrical current to flow through the food. The impedance (resistance) of the food to the electrical current causes the food to heat up, and resulting in cooking of the food. Impedance of the food is a material property that is also dependent upon temperature. Impedance generally increases as temperature of cooking increases, and this property may be used to detect when cooking has been completed. For example, the impedance of a meat patty at 120 degrees Fahrenheit is lower than a meat patty at 155 degrees Fahrenheit, and this impedance difference can be used to detect the extent of cooking or doneness of the food. Any suitable method to measure impedance within a circuit can be used.

Figure 1:
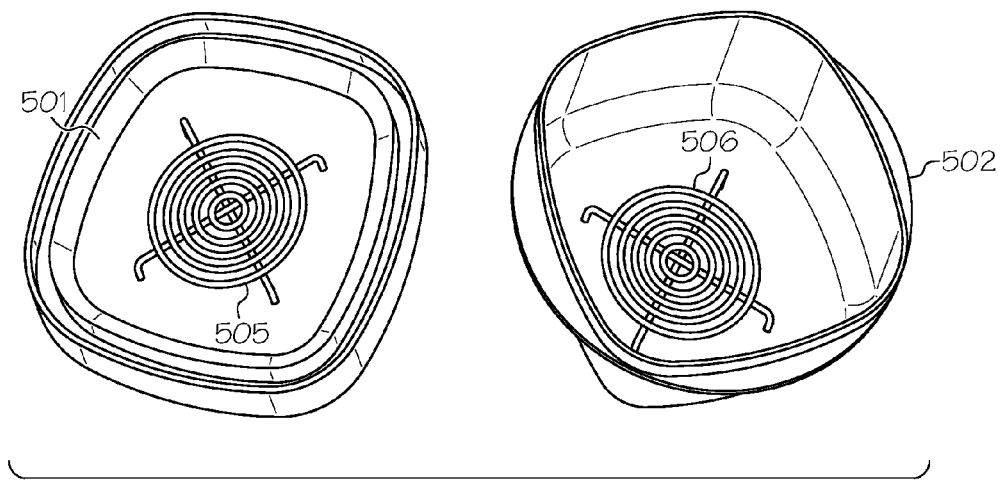
FIG. 1 shows a food compartment comprising an insulated plastic bowl or container, an insulating lid, a conductive electrode grid within the bowl, and a second conductive grid mounted on the lid, according to one or more embodiments shown and described herein.
Figure 2:
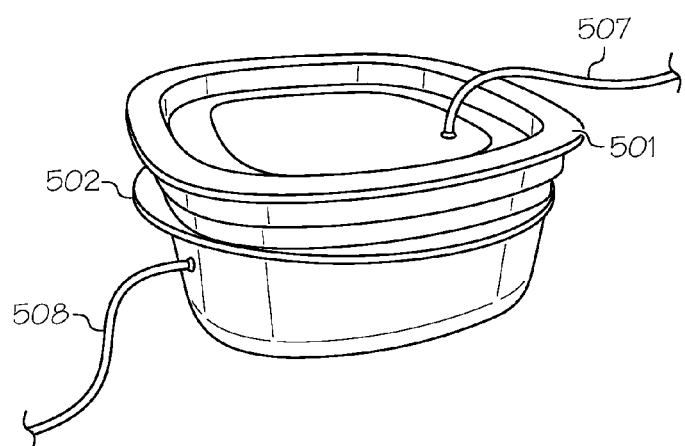
FIG. 2 shows the food compartment of FIG. 1 in closed form with the insulating lid covering the insulated plastic bowl, according to one or more embodiments shown and described herein.

The food compartment may comprise an insulated plastic container, an insulating lid, a conductive electrode grid within the bowl, and a second conductive grid mounted on the lid, as shown in FIG. 1. In FIG. 1, the bowl 502 with insulating exterior is shown along with lid 501, the bowl having an electrode 506 and the lid having an electrode 505 disposed internally. FIG. 2 shows the lid 501 on top of the bowl 502 in a closed or sealed configuration. Each of the conductive electrodes is connected to a conductive lead that terminates in a connector for connection to a power source. In FIG. 2, a lead 507 attaches to the lid electrode 505 and a lead 508 attaches to the bowl electrode 506. The leads may be in the form of twisted pair conductors, coaxial conductors, or other standard forms known to those skilled in the art and as may be convenient for the application. In one embodiment, at least one of the conductive electrodes 505, 506 is mounted on an elastic member within the insulated container.

Figure 3:
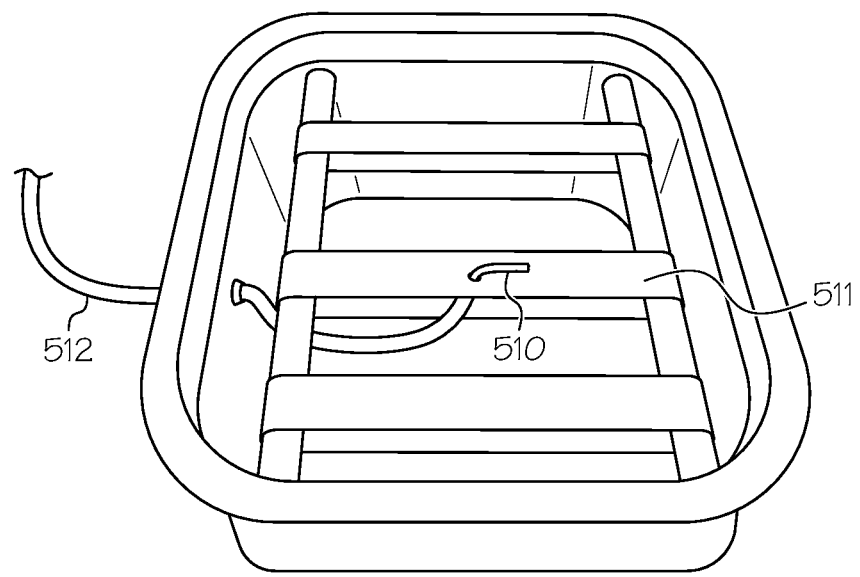
FIG. 3 shows an exposed conductive electrical lead placed on top of an elastic member and extending out through the exterior of a container to a connector, according to one or more embodiments shown and described herein.
Figure 4:
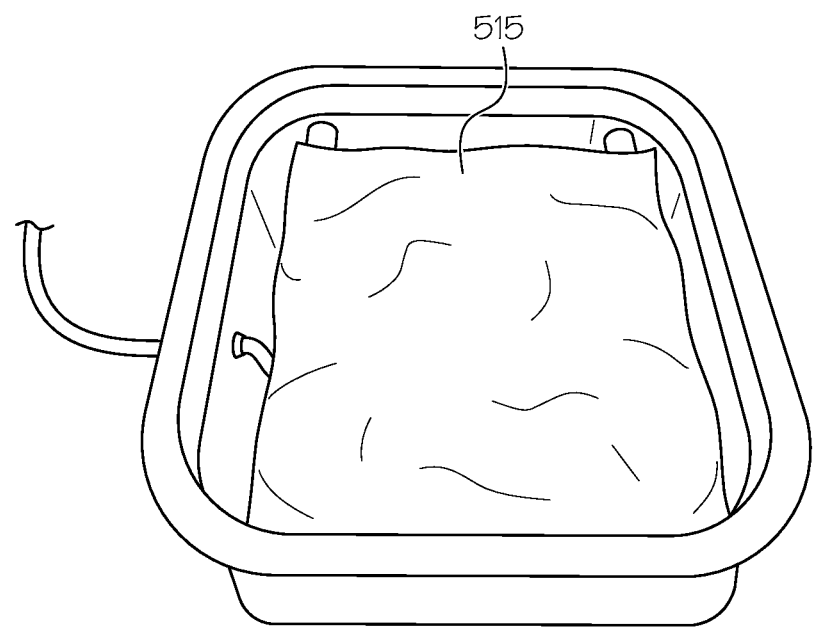
FIG. 4 is an illustration showing foil or other thin conductive member that can be placed on top of the elastically mounted exposed conductive electrical lead of FIG. 3, according to one or more embodiments shown and described herein.

In another embodiment, an exposed conductive electrical lead is placed on an elastic member and extends out through the exterior of container to a connector, as shown in FIG. 3. In FIG. 3, an exposed electrical lead 510 is placed on an elastic member 511 and a lead 512 extends out through the exterior of the container. Furthermore, foil or other thin conductive member can be placed on the elastically mounted exposed conductive electrical lead as shown in FIG. 4, where foil 515 is shown to be placed on the elastically mounted exposed conductive lead (covered by the foil in the figure). Food such as a meat patty could be placed on top of the thin foil. A lid with a second conductor could then be placed on top, compressing the meat patty between two elastic and conductive surfaces. In one embodiment, the second electrode placed on top could be a saline soaked sponge. Such a manner of mounting the food and providing electrical contact disperses the current flow evenly throughout the food and provides for even cooking throughout the heating cycle, even if the meat patty changes thickness. It also allows juices to pass out and drip to an area below the conductive electrodes but remain neatly captured within a portable container.

In one embodiment, the food compartment contains no active electric component. Therefore, when the container is disconnected from the power source, it can be submerged in water or placed in a dishwasher to be cleaned. The compartment can be in a remote location from the power source, allowing use in a convenient location that may be different from the location where the power source is placed. Since the cooking device creates heat within the food and does not need to heat up a large chamber (like an oven, charcoal grill, or gas grill), the described cooking device is very energy efficient compared to those other methods of cooking.

Figure 5:
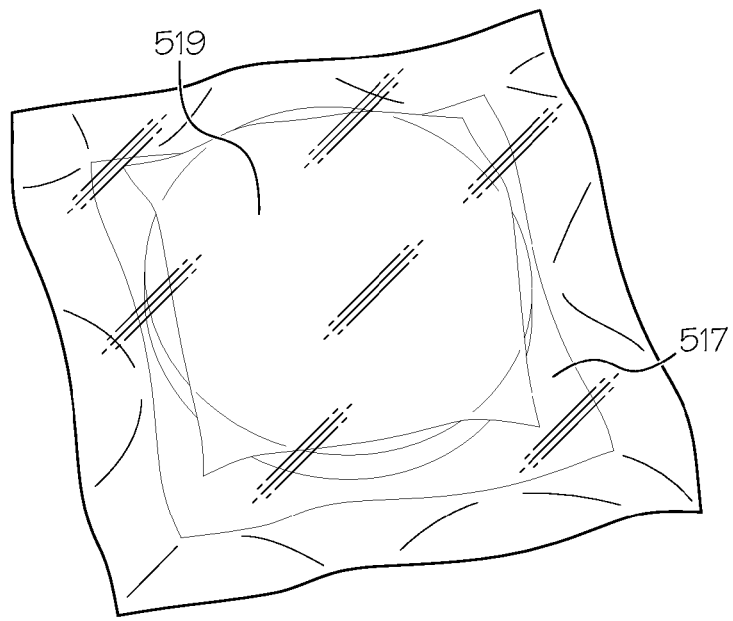
FIG. 5 is a depiction of a hamburger patty having one foil layer in contact with the top, and a second foil layer in contact with the bottom, all of which is vacuum-sealed inside a plastic pouch, according to one or more embodiments shown and described herein.
Figure 6:
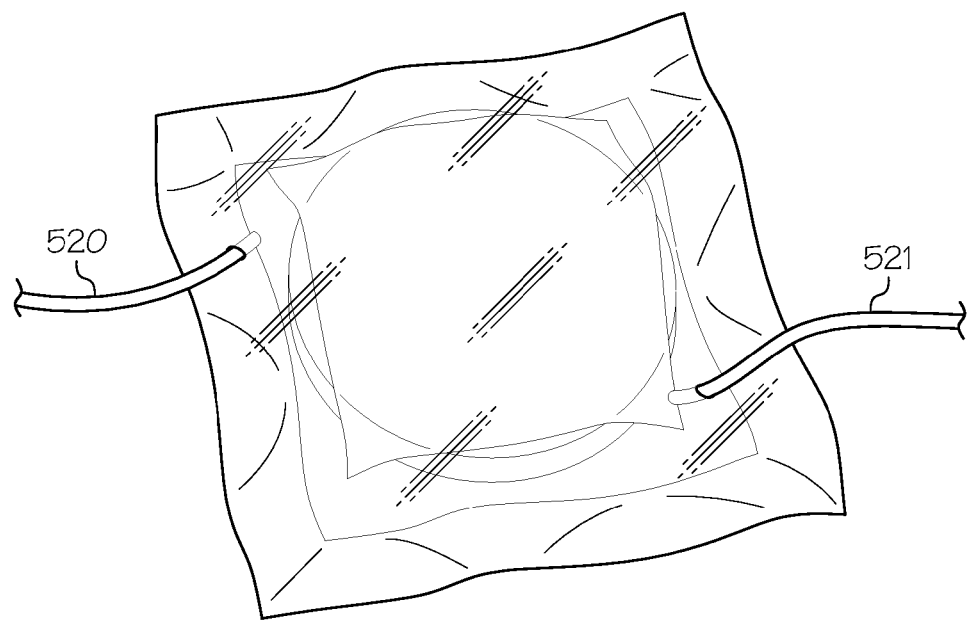
FIG. 6 illustrates electrical connections that are physically made through the pouch also shown in FIG. 5.

Another embodiment of the food compartment comprises a sealed food package. For example, a lamination of insulating layer on the exterior and a conductive layer on the inside can be used to create a sealed package for food to preserve freshness and allow handling such as shipping. For example, a hamburger patty can have one foil layer in contact with the top, and a second foil layer in contact with the bottom, all of which is vacuum-sealed inside a plastic pouch, as shown in FIG. 5, where the two foil layers 517 and 519 on either side of the food are indicated. Electrical connections can be physically made through the pouch as shown in FIG. 6, where the leads 520 and 521 are indicated, or capacitively coupled through the pouch to the foil. Any suitable method of capacitive coupling may be used.

Such a food package could be stored in a refrigerator until use. The power source can be connected to the container, the food cooked and the patty removed. The food container can be disposed of. Indeed, the cooking can even be performed while the packaged food is still inside the refrigerator. The patties can be prepackaged in a way to provide a predetermined impedance value that allows efficient delivery of power from a power source. For example, if an audio amplifier is utilized in the power source, an impedance value of food in the package in the range of 10 to 25 ohms would allow for efficient and quick cooking. This is an advantage for those in a hurry.

Marinating food prior to packaging inside the sealed electrode container can improve flavor and conductivity. In one embodiment, manipulating the amount of marinade can allow the packager to set an impedance value for the contents of a package, providing an advantage of speed or efficiency for cooking using the high frequency power source.

The power source may comprise a function signal generator and an amplifier. The function signal generator creates a wave with a defined frequency, shape, and amplitude. In one embodiment, the high frequency signal, in the range of 1 Hz to 1 MHz, and more specifically in the range between approximately 20 kHz and approximately 50 kHz, is amplified by the amplifier. The power rating of the amplifier will determine the speed with which food can be cooked, with higher powers allowing for faster cooking times. Surprisingly, a patty of raw hamburger has an impedance similar to a typical speaker. This allows the audio amplifier to drive current through the meat patty that allows cooking to a temperature of 150 degrees Fahrenheit in about 5 to 10 minutes. A variety of commercially available signal generators suitable for the purpose exist, such as for exemplary purposes the Rigol DG1022, and likewise a variety of suitable amplifiers are commercially available as well, such as for instance the Onkyo tx-8522 audio stereo receive, or the Boss AR1500M.

The power source can be physically located a remote distance from the food container when connected by wires similar to the way in which an audio amplifier is connected to a speaker. The power source is capable of producing a biphasic wave with frequency in the range from 1 Hz to 1 MHz. The biphasic wave can have a sinusoidal shape, a square wave shape, a triangular shape, or a variety of other shapes. The power source amplifier can be capable of amplifying an audio signal such as music from an MP3 player to listen to music as the food is cooking.

The controller can comprise a microprocessor and a sensor. The controller is connected to the power source to determine the duration, frequency, and amplitude of the high frequency current to be delivered to the food container. A controller system can be configured to provide constant voltage, constant current, or constant power. Selecting one of these methods can allow the cooking device to function in different ways. The controller provides a means for the cooking device to be self-limiting, meaning that it will automatically stop (or be unable to) deliver power when the food reaches a certain high impedance value, which can be predicted in part based on the temperature reached.

The microprocessor of the controller can store personal preferences or programs and control output of the power source to cook food precisely each time, or run algorithms that control the output of the power source based on values from sensors in or near the food in the food compartment. For example, the sensor can actively monitor food temperature, and the microprocessor can allow the power source to deliver a set number of Joules over a set period of time when the food is below a first threshold temperature. When the first threshold temperature is exceeded, the microprocessor controls the power output to a different number of Joules for a given time until a second threshold temperature is reached.

After exceeding the second threshold temperature, a third level of Joules per time can be delivered. This may be referred to as staged cooking based on temperature, and in this example, there are three stages. Stage 1 (before reaching the first threshold temperature) may have the highest power (Joules/sec), and Stage 2 (between first temperature threshold and second temperature threshold) may have a lower power output than stage 1, and Stage 3 (above the second temperature threshold) may have an even lower power output. The foregoing example is provided for non-limiting exemplary purposes only, and it should be apparent to one skilled in the art that a wide range of various numbers of stages and thresholds may be incorporated, or the thresholds may be impedance values instead of temperatures.

The microprocessor can allow the user to input the type of food being cooked, and run a predetermined algorithm based on experimental data to cook a certain food. For example, the output algorithm for a fish fillet would be different from the output algorithm for a sausage patty. These algorithms can be pre-programmed and stored within the microprocessor so that a user may select them as part of the cooking process. Similar algorithms or programs may be created to thaw frozen food, or cook food that is refrigerator temperature rather than room temperature.

One embodiment of the controller can include a temperature sensor positioned within the food to monitor temperature during cooking. This can be connected to a circuit that allows a user to pre-select the desired temperature at which to stop the cooking device from delivering power. The controller can send a signal to a personal device such as a cell phone or personal computer that the food is either finished cooking or is about to be finished. In another embodiment, the sensor can monitor impedance of the food within the food container while the food is cooking. In still another embodiment, the controller is programmable by a user so that the user may select a target cooking impedance. For example, the user may select an impedance at which the food should be considered "done", and the controller will shut off the power source when the food reaches that impedance.

The following table shows examples of appropriate settings for various food types based on experiments, when starting with raw refrigerator-temperature food. These settings are exemplary and not meant to be limiting.

| Food type | Frequency, kHz | Vrms, V | Initial impedance, Ohms | Time, min |
| --- | --- | --- | --- | --- |
| steak | 40 | 6 | 4 | 10 |
| Ground beef patty | 50 | 17.3 | 9.5 | 10 |
| Chicken breast | 42 | 12 | 4.5 | 12 |
| Tilapia fillet | 42 | 9 | 3.5 | 22 |
| Cod fillet | 42 | 17 | 8.5 | 16 |

A mobile version of the cooking device is another embodiment. The power source can be mounted in a vehicle and the food compartment can be connected to heat or can cook food during a long commute. The food compartment can be sealed to prevent spillage. The food compartment can include means to drain fluid from the cooked food. For example purposes, this portable device can be used at the beach, campground, dormitory room, apartment, mobile home, during a tailgating event, or in a boat, or in a variety of other outdoor or indoor settings.

The cooking device can be capable of heating the contents of a sandwich. In such an instance, the electrodes may be placed on the bread. The frequency may be sufficiently high to capacitively couple the energy through the bread and heat the contents which have a higher impedance, in turn creating heat when the power is applied. This can be done quickly without making the sandwich soggy, which frequently occurs using other methods such as a microwave oven.

Foods that are well suited for this cooking system are meat patties (hamburger, sausage, ground beef, and ground turkey), fish, chicken, or other meats. Eggs, ham, and other high protein foods also provide adequate impedance for cooking with this device.

Figure 7:
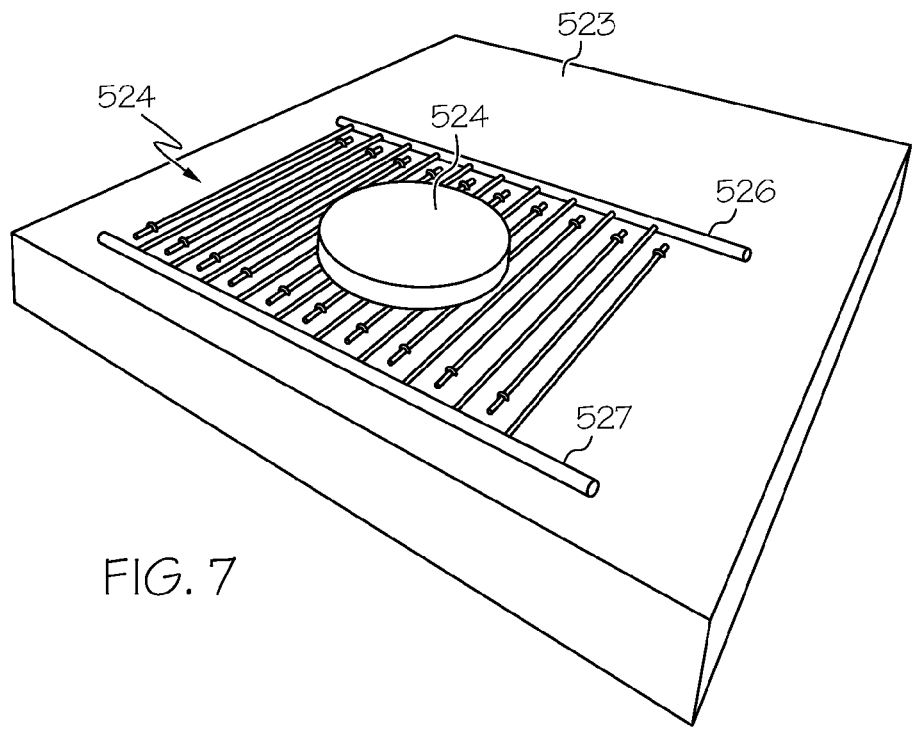
FIG. 7 depicts an alternative embodiment of the high frequency cooker in the form of a bipolar grill mounted on an insulating cutting board to create a searing surface, according to one or more embodiments shown and described herein.

An alternative embodiment of the high frequency cooker is a bipolar grill mounted on an insulating cutting board to create a searing surface. When food is seared on the outside, desirable juices are trapped inside, providing better flavor and texture. Searing of meat or fish patties can be accomplished with grates of 1.5 mm diameter and a spacing between grates of about 5 to 10 mm. The grates are connected such that opposite poles of the energy source are connected to alternating grates, creating energy flow from one grate, through the food, to the other grate. As shown in FIG. 7, a patty 524 is placed on a grill 522 atop an insulating cutting board 523. Alternating grates such as 526 and 527 are electrically oppositely polarized, the resulting current flow thereby cooking the food in between.

Figure 8:
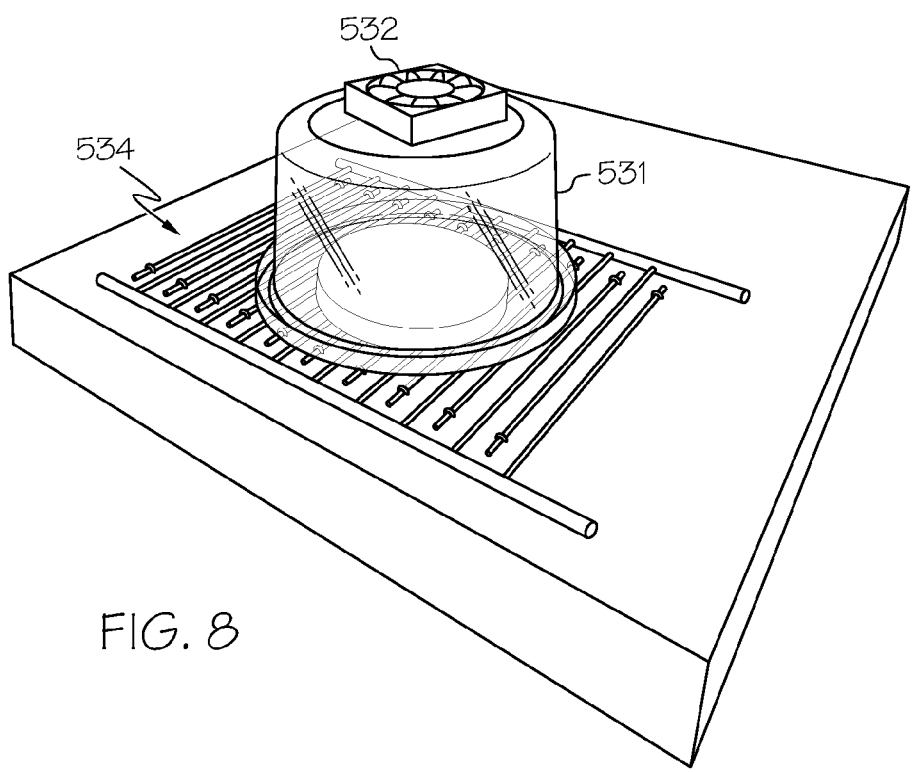
FIG. 8 is an illustration of a fan mounted on an insulated container surrounding food on the surface of FIG. 7 to increase speed of cooking, according to one or more embodiments shown and described herein.
Figure 9:
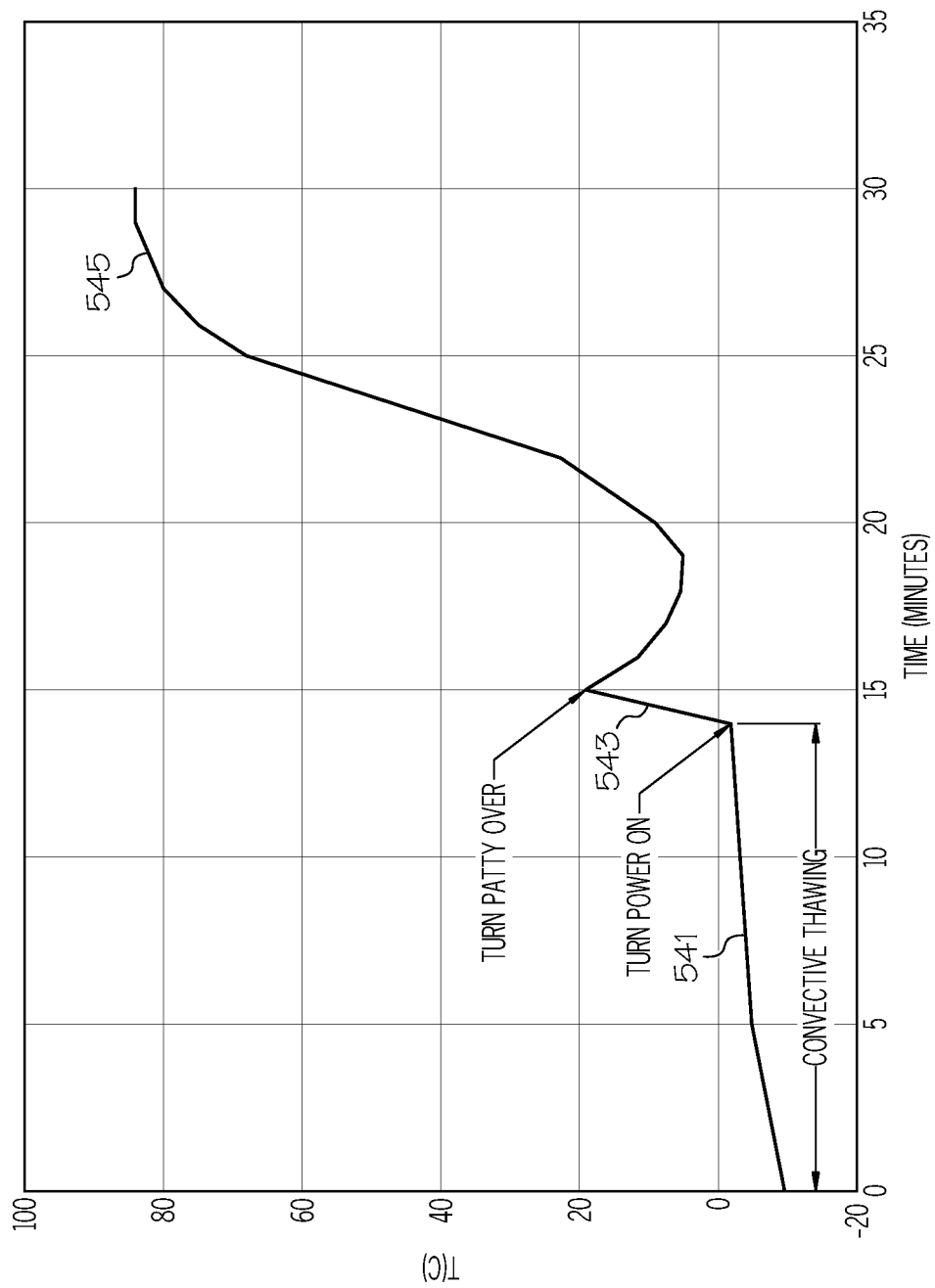
FIG. 9 shows an exemplary plot of temperature measured within a patty as it is cooked on a bipolar grill.

In one embodiment, a fan can be mounted on an insulated container surrounding the food on the surface to increase speed of cooking. This is illustrated in FIG. 8, where a fan 532 is on top of insulated container 531 surrounding food to be cooked on grill 534. FIG. 9 shows a plot of temperature versus time measured within a patty as it is cooked on a bipolar grill. It is evident from the plot that the rate of increase of temperature shown in sections 543 and 545 of the plot is substantially faster than the relatively slow rate of purely convective thawing in section 541.

One example of energy settings for use with such a grill to produce the desired searing effect on food with an impedance in the range between approximately 5 ohms and approximately 10 ohms is applying voltage between about 15 and 25 V (RMS, or root mean square) in a sine wave with a frequency of between approximately 20 kHz and approximately 45 kHz to the grill electrodes. Depending on food surface area and number of sides, it can take between approximately 2 minutes and approximately 30 minutes to achieve the desired searing around the outside of the food. With this embodiment, it may be necessary to turn the food over so that each surface that is desired to be seared comes in contact with the electrodes on the grill. Because the impedance of the food causes the heating in the food, the grates of the bipolar grill do not heat up except from thermal conduction due to contact with the food. This is in contrast to other grill surfaces which are hot to the touch. The bipolar grill will not have a significantly elevated temperature after food has been removed from its surface, making it quick and easy to clean.

Figure 10:
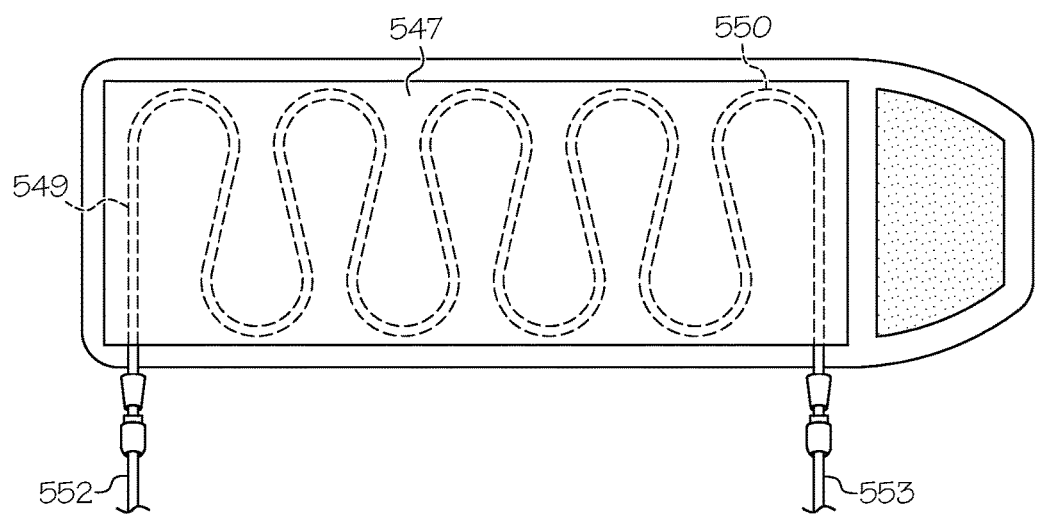
FIG. 10 is an illustration of alternating electrode elements embedded in a membrane with wires that extend to a power source, according to one or more embodiments shown and described herein.
Figure 11:
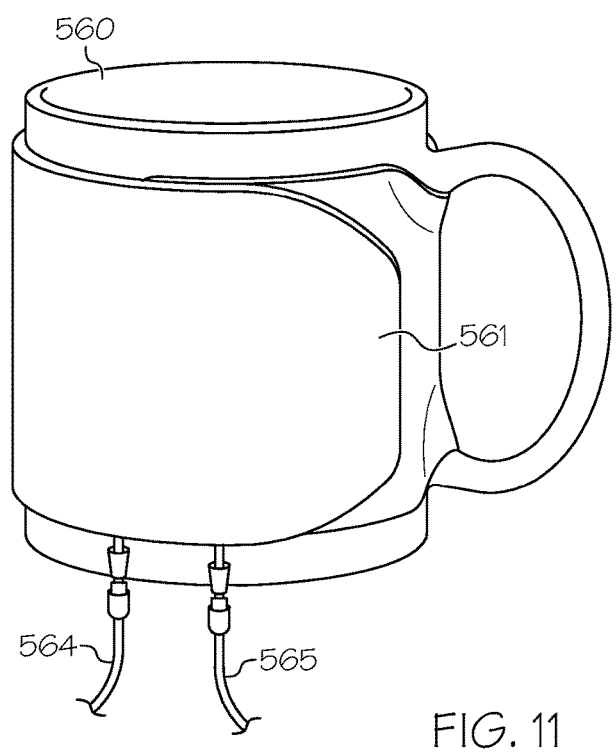
FIG. 11 shows a membrane wrapped around the external surface of a cup or mug, and then connected to an energy source, according to one or more embodiments shown and described herein.

Yet another embodiment of the high frequency cooker is a configuration that heats up a cup of fluid, such as a cup of coffee. Alternating electrode elements may be embedded in a membrane with wires that extend to a power source, as illustrated in FIG. 10, where electrode elements 549 and 550 are shown embedded in membrane 547 and attached to leads 552 and 553. Such a membrane can be wrapped around the external surface of a cup or mug, and then connected to an energy source, as shown in FIG. 11. An insulating layer is wrapped around, so that the heated fluid stays at an elevated temperature. In FIG. 11, an insulating layer 561 is shown wrapped around membrane electrode elements (not seen)

wrapped around a mug 560, with electrode leads 564 and 565 connected to a power source.

In one embodiment, the high frequency cooker can actively thaw and cook food within the same described container. With good electrode contact on the food that is evenly distributed over the top and bottom surfaces, active thawing with heating element and high frequency energy combination electrodes can evenly warm food without creating cooked spots around a frozen center like a microwave oven often does.

Figure 12:
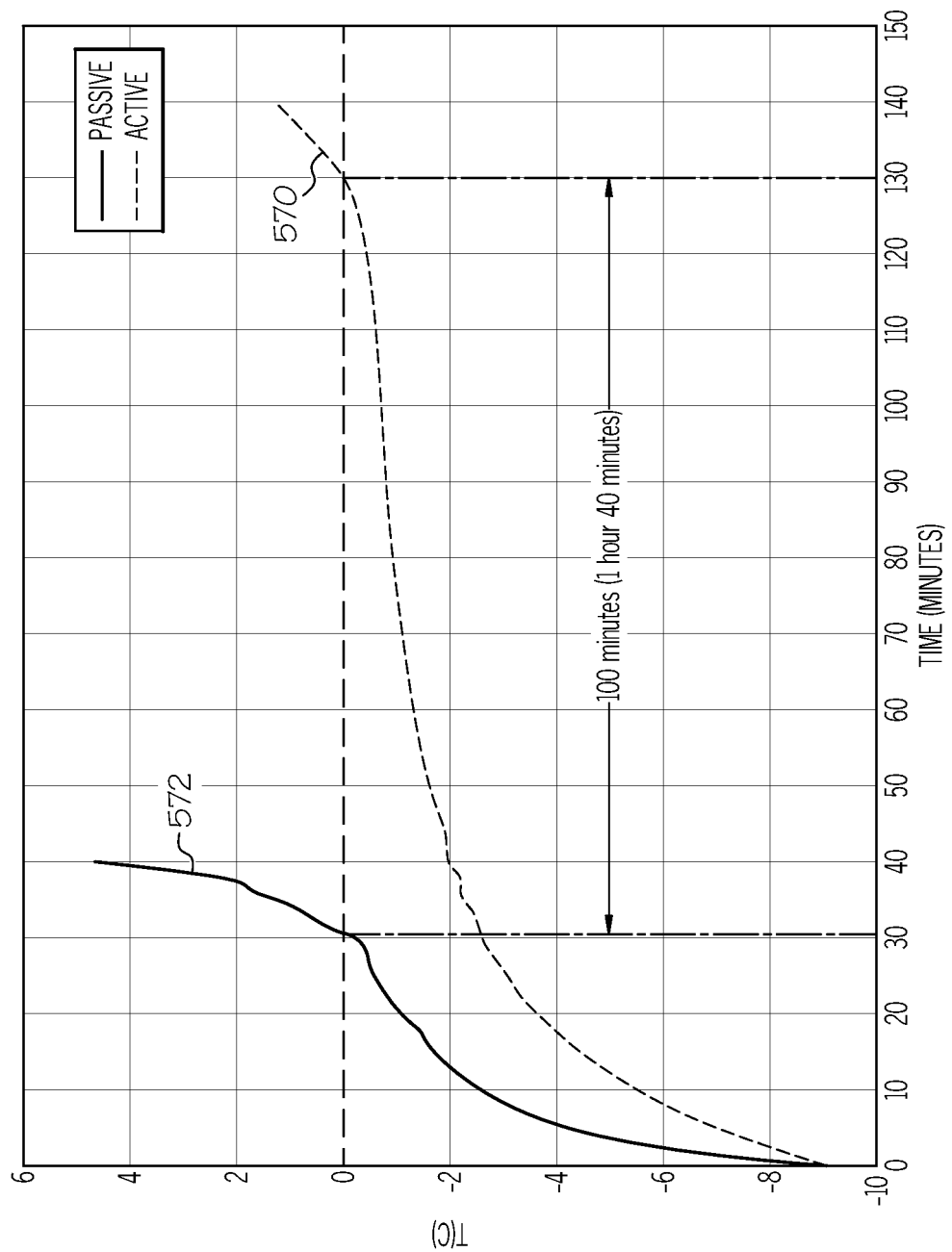
FIG. 12 is an exemplary graph showing the reduction in time that may be achieved through active thawing with high frequency electromagnetic energy.

FIG. 12 illustrates a reduction in time that may be achieved through active thawing with high frequency energy in the form of a graphical plot showing empirical data at a single location in a food sample for increase in temperature with time, where the curve 570 is the plot corresponding to passive cooling and curve 572 is the plot corresponding to active thawing. In contrast to the long time interval of 130 minutes that the passively thawed sample requires to thaw from a temperature of −10 degrees Celsius to 0 degrees Celsius, the actively thawed sample requires only 30 minutes to undergo the same rise in temperature, a large difference of 100 minutes or over an hour and a half. The efficacy of active thawing that is achievable with the electrode-driven active thawing is evident from this data.

Figure 13:
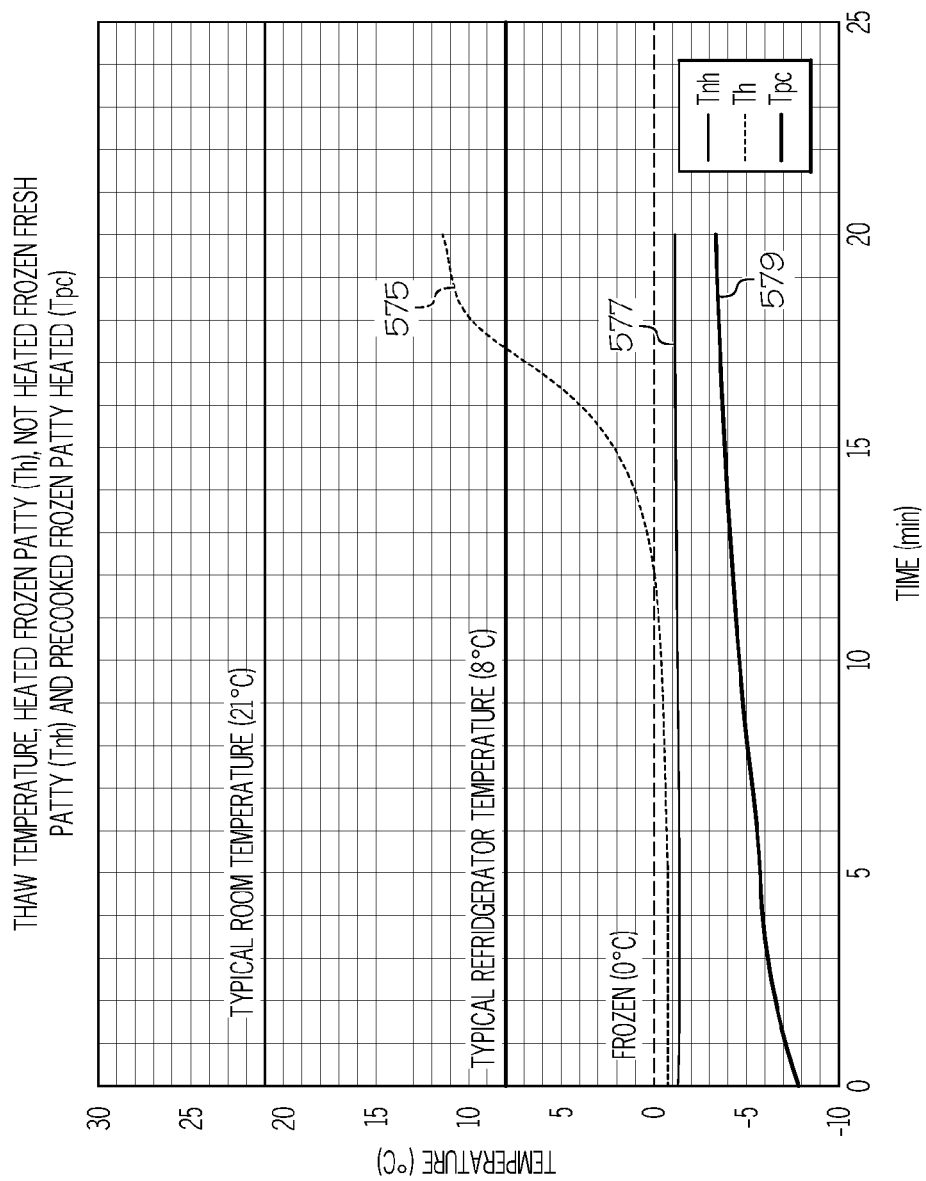
FIG. 13 is another exemplary graph demonstrating the reduction in time that may be achieved through active thawing with high frequency electromagnetic energy.

FIG. 13 illustrates the thawing of a frozen fresh hamburger patty with and without active heating, and the active heating of a precooked frozen patty, in the form of plots of temperature vs. time. The temperature rise shown by the curve 575 for actively heated frozen fresh patty is seen to be considerably faster than that of curve 577 corresponding to a passively thawed frozen fresh patty over a 20 minute time interval. Even a precooked frozen patty initially at a temperature of 4 degrees Celsius is seen to rise in temperature by 6 degrees Celsius when actively heated over a 20-minute time interval.

Figure 14:
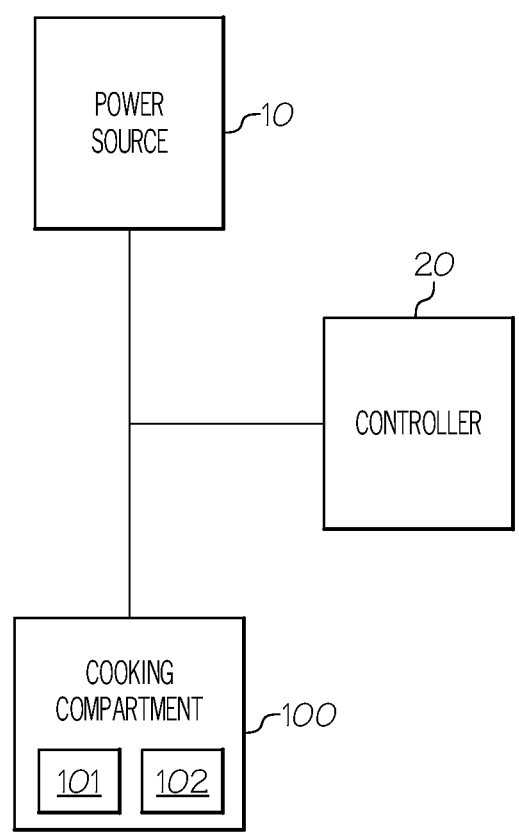
FIG. 14 is a block diagram of the cooking device as a system including a power source, a controller, a cooking compartment, and first and second electrodes, according to one or more embodiments shown and described herein.

FIG. 14 is a block system diagram of the cooking device of the present disclosure, showing a power source 10, a controller 20, a cooking compartment 100, a first electrode one 101, and a second electrode 102.

Figure 15:
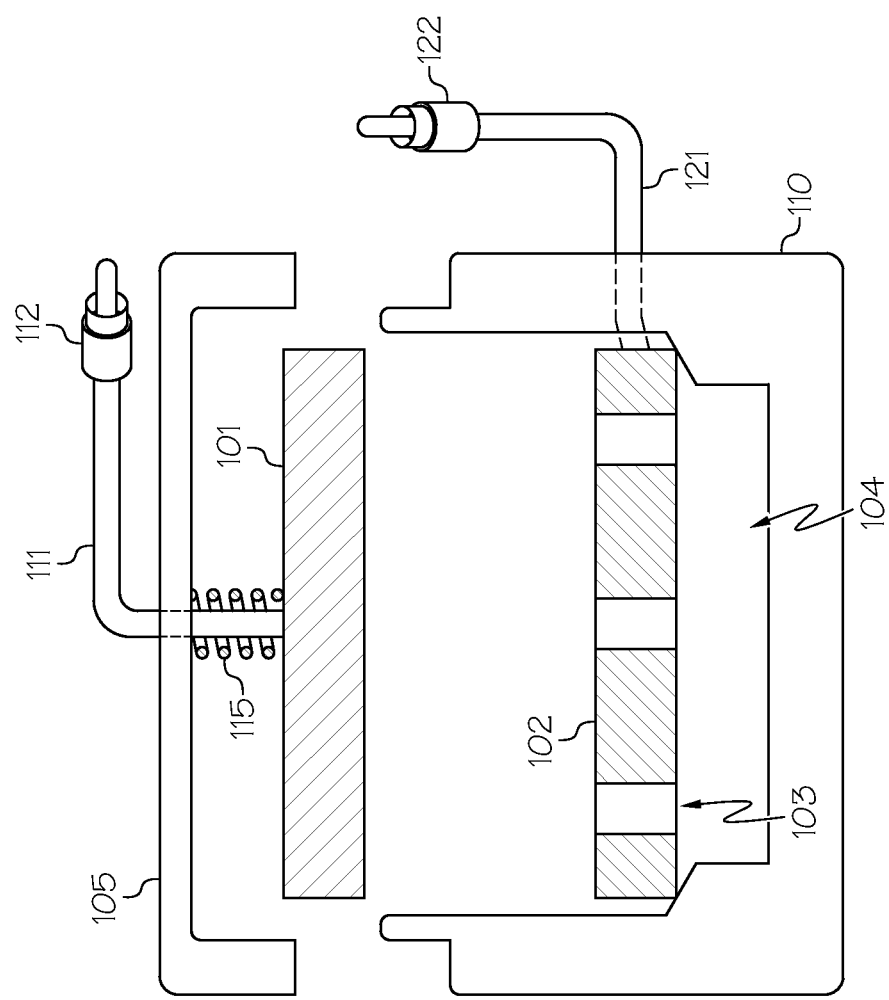
FIG. 15 illustrates a cooking compartment with a lid, a first electrode, a second electrode with at least a drain hole, a bottom with a fluid retention basin, a first lead and a first connector to the first electrode, a second lead and second connector to the second electrode, and a spring-loaded member between the lid and the first electrode, according to one or more embodiments shown and described herein.

FIG. 15 depicts an embodiment in the form of a cooking compartment showing a lid 105, a first electrode 101, a second electrode 102 with at least a drain hole 103, a bottom 110 with a fluid retention basin 104, a first lead 111 and a first connector 112 to the first electrode 101, a second lead 121 and second connector 122 to the second electrode 102, and with a spring-loaded member 115 between the lid 105 and the first electrode 101.

Figure 16:
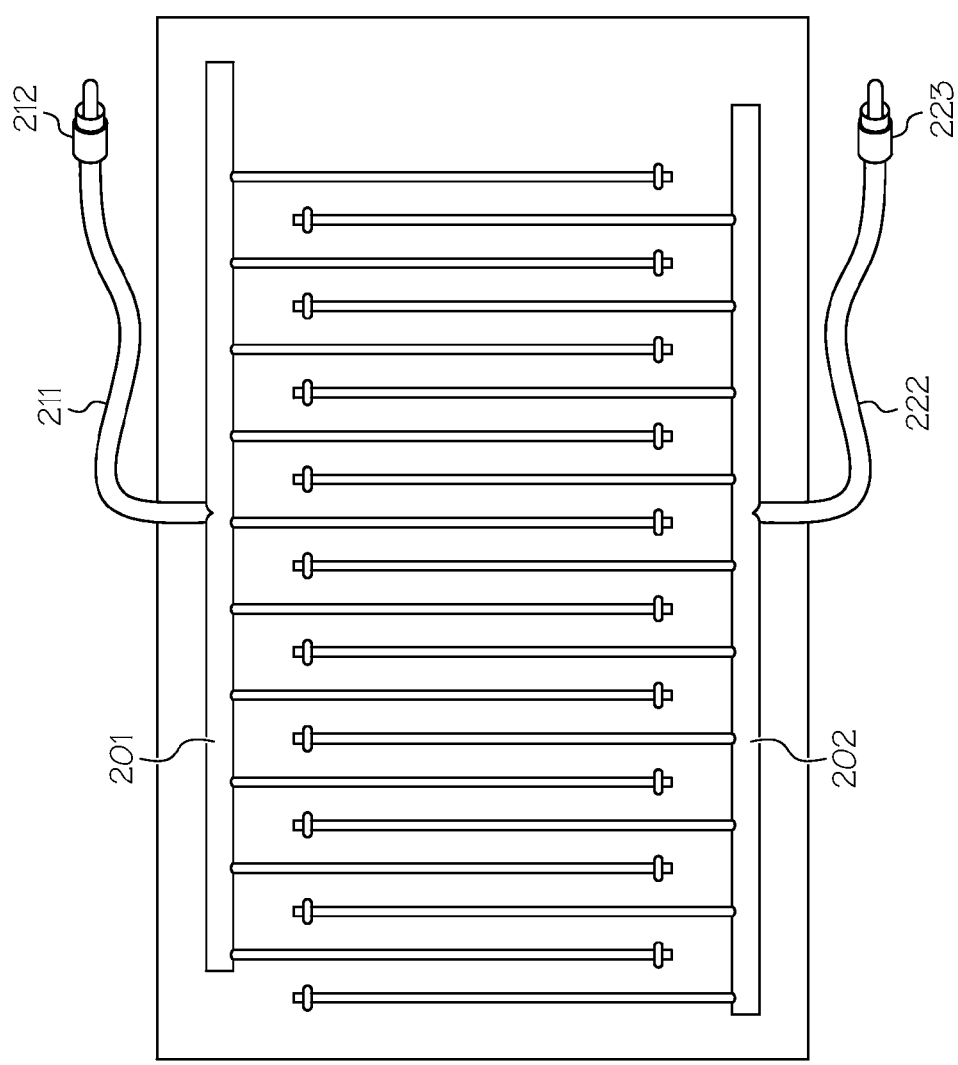
FIG. 16 is a sketch of a bipolar grill with alternating contact electrodes showing a first grill electrode, a second grill electrode, a first lead and a first connector to the first grill electrode, a second lead and a second connector to the second grill electrode, according to one or more embodiments shown and described herein.
Figure 17:
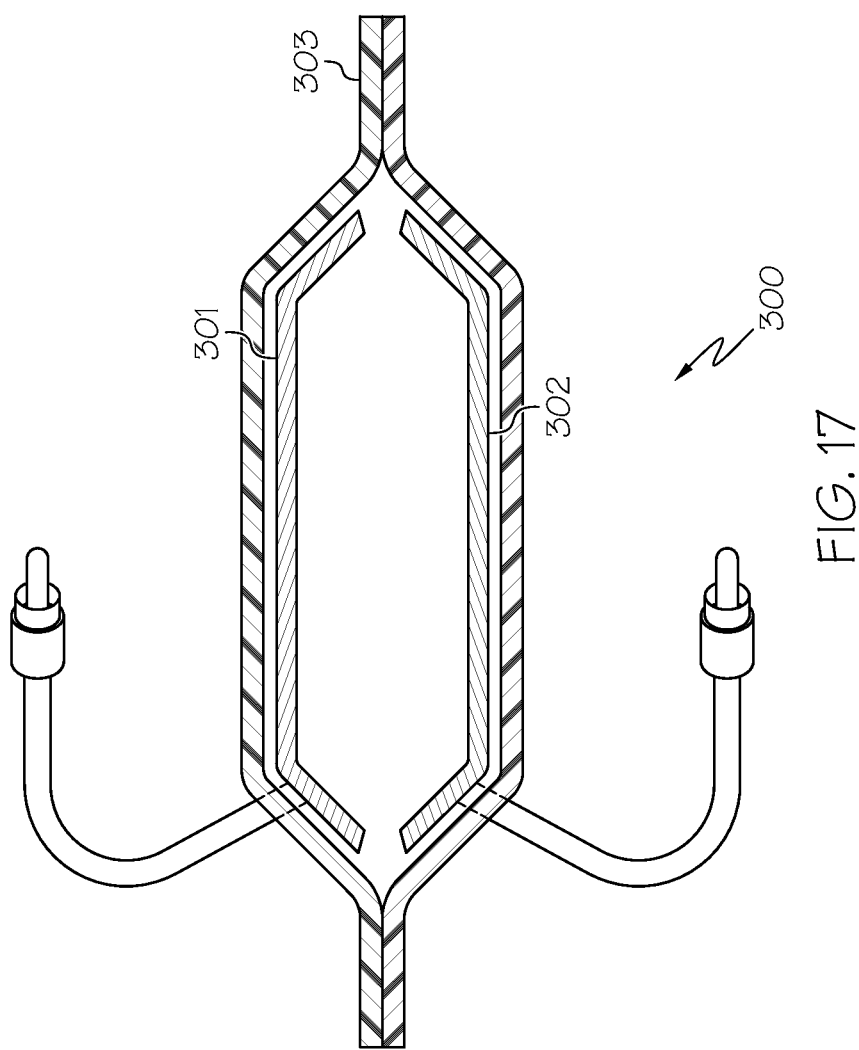
FIG. 17 shows a vacuum-sealed package with a first conductive electrode on top and a second conductive electrode on the bottom on the inside surface of a sealed polymer container, according to one or more embodiments shown and described herein.

FIG. 16 is an illustration of a bipolar grill 2 with alternating contact electrodes showing a first grill electrode 201, a second grill electrode 202, a first lead 211 and a first connector 212 to the first grill electrode 201, a second lead 222 and a second connector 223 to the second grill electrode 102. FIG. 17 illustrates another embodiment in the form of a vacuum-sealed package 300 with a first conductive electrode 301 on top and a second conductive electrode 302 on the bottom on the inside surface of a sealed polymer container 303.

Figure 18:
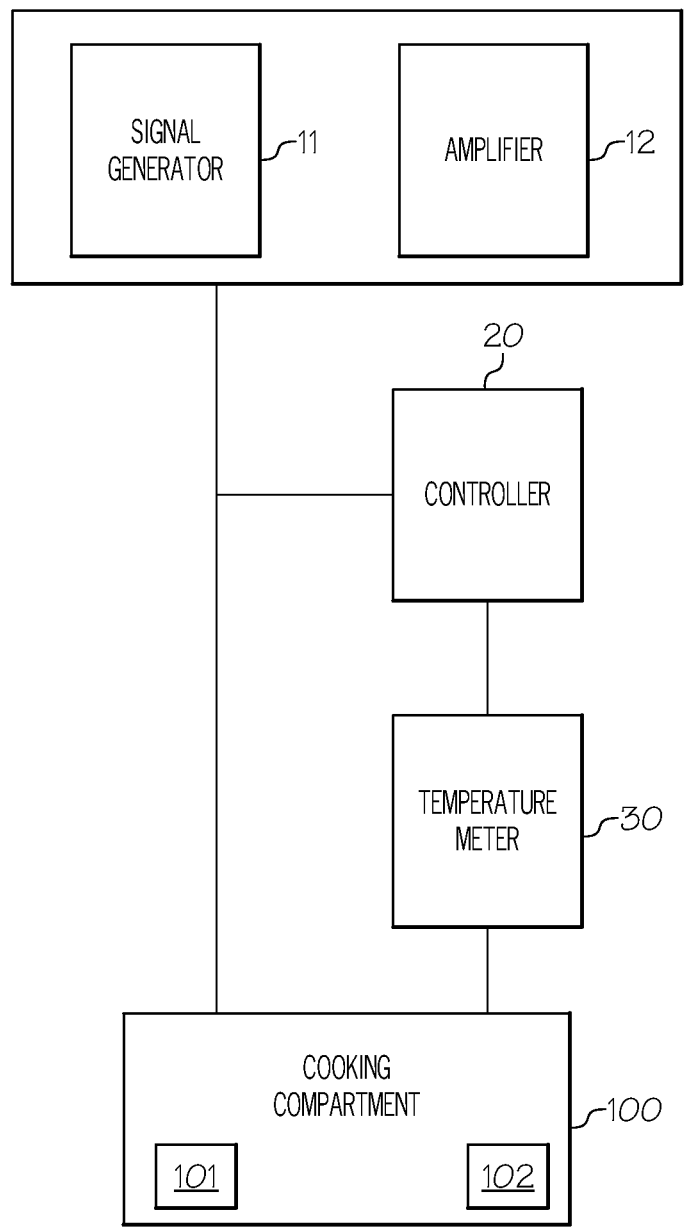
FIG. 18 is a block diagram of an embodiment of a cooking device containing the power source comprising a signal generator and an amplifier, a controller, a temperature meter, a cooking compartment, and first and second electrodes, according to one or more embodiments shown and described herein.

FIG. 18 is a block or system diagram of an embodiment in the form of a cooking device 1 containing a power source 10 comprising a signal generator 11 and an amplifier 12, a controller 20, a temperature meter 30, a cooking compartment 100, a first electrode 101, and a second electrode 102.

Figure 19:
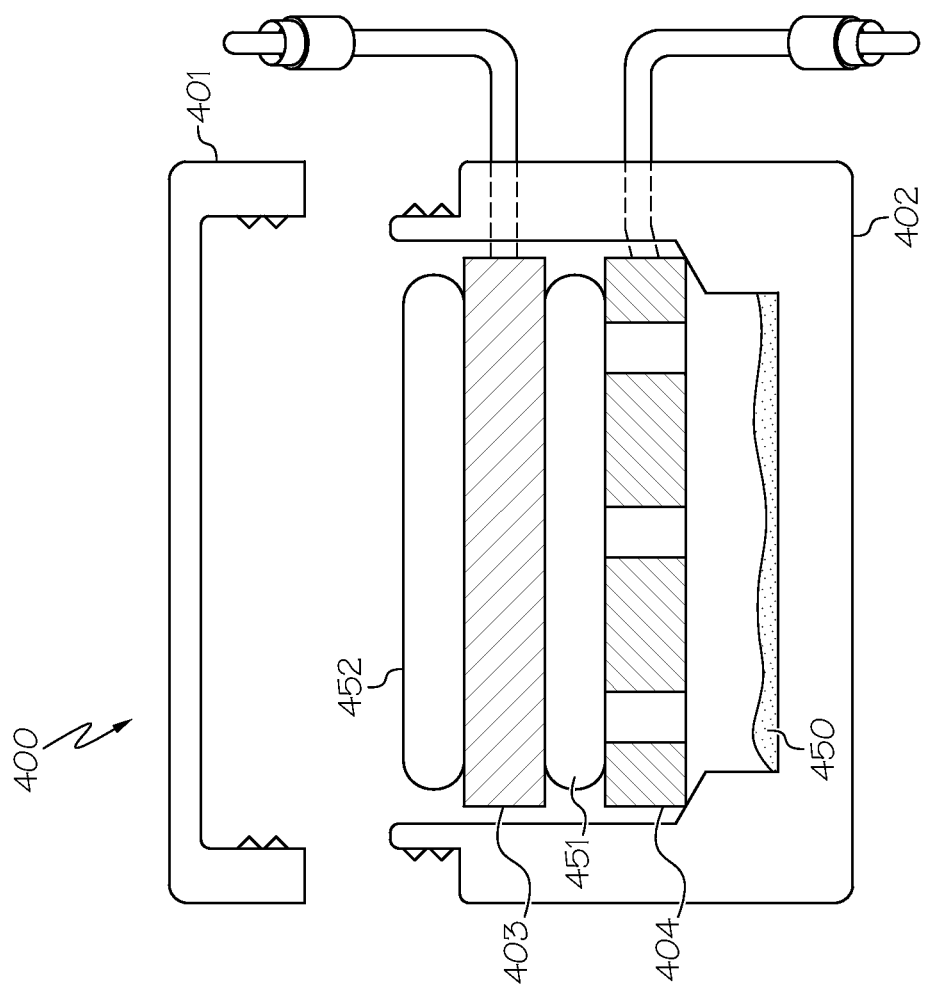
FIG. 19 depicts a section view of a dual chamber device having a lid, a bottom, and first and second electrodes, according to one or more embodiments shown and described herein. A second cooking chamber is formed between the lid and first electrode, a first chamber is formed between the first electrode and the second electrode, and a fluid retention chamber is formed between the second electrode and the bottom.

FIG. 19 shows a section view of another embodiment in the form of a dual chamber device 400 having a lid 401, a bottom 402, a first electrode 403, and a second electrode 404. A second cooking chamber 452 is formed between the lid 401 and first electrode 403, a first chamber 451 is formed between first electrode 403 and second electrode 404, and a fluid retention chamber 450 is formed between the second electrode and the bottom 402.

While various specific examples and embodiments of devices and methods for cooking food with RF energy were described in the foregoing for non-limiting illustrative and exemplary purposes, it should be clear that a wide variety of variations and alternate embodiments could be conceived or constructed. While specific methods of cooking containers, cooking packages, frozen food heaters, and electrodes were disclosed, persons skilled in the art would recognize that any of a wide variety of other embodiments of RF-based cooking devices with multiple compartments, multiple electrodes, a range of electrode designs, and so on can be implemented without departing from the scope of the present specification. Likewise, embodiments in the form of RF electromagnetic energy-based cooking devices at various size scales are inherently included in the descriptions herein, ranging from small mobile or portable devices that may even be powered with battery sources, to appliances for home use, to even larger appliances such as cafeteria equipment that may serve a larger group of people.

Accordingly, while many variations of methods and tools disclosed here can be constructed, the scope of the present description is limited only by the appended claims.

What is claimed is:

1. A cooking device comprising:
   a. a food container wherein the food container includes a first electrode, a second electrode, and an insulating exterior;
   b. a power source for RF electromagnetic energy;
   c. a controller; and
   d. a wireless signal generator, wherein the signal generator remotely signals a mobile device when the controller detects a predetermined impedance.

2. The device of claim 1, wherein the food container comprises a plastic compartment, a lid, and at least one elastic member.

3. The device of claim 1, wherein the power source comprises a function signal generator.

4. The device of claim 3, wherein the function signal generator operates at a frequency between 60 Hz and 1 MHz.

5. The device of claim 1, wherein the controller comprises a microprocessor and a digital circuit.

6. The device of claim 5, wherein the controller comprises a temperature sensor.

7. The device of claim 1, wherein the power source is remote, and the food container is connected by conductive leads to the power source.

8. The device of claim 1, wherein the controller monitors impedance between electrodes and automatically stops power delivery at a predetermined impedance level.

9. The device of claim 1, wherein the food container is dishwasher-safe.

10. The device of claim 7, wherein the leads have connectors that permit the cooking chamber to disconnect from the power source and controller.

11. The device of claim 1, wherein the food container is disposable.

12. A device for cooking food comprising:
   a. an energy source;
   b. first and second electrodes for delivering electromagnetic energy;
   c. a controller;
   d. a first cooking chamber;
   e. a second cooking chamber; and f. a connection between the first and second chambers; and g. a wireless signal generator, wherein the signal generator remotely signals a mobile device when the controller detects a predetermined impedance.

13. The device of claim 12, wherein the food container comprises a plastic compartment, a lid, and at least one elastic member.

14. The device of claim 12, wherein the energy source comprises a function signal generator.

* * * * *